Dec. 13, 1966

B. L. SIEGAL 3,290,721

FOOD PRODUCT FREEZING DEVICE

Filed March 3, 1965

Inventor
Burton L. Siegal
By Silverman + Caso
Attys.

Dec. 13, 1966  B. L. SIEGAL  3,290,721
FOOD PRODUCT FREEZING DEVICE
Filed March 3, 1965  2 Sheets-Sheet 2
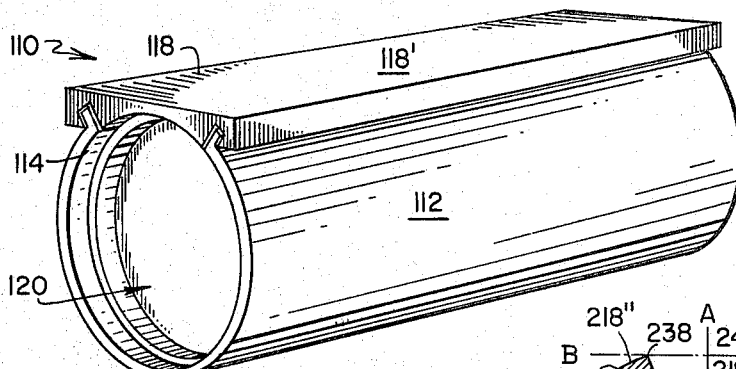
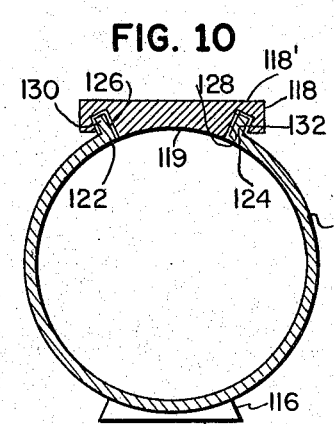
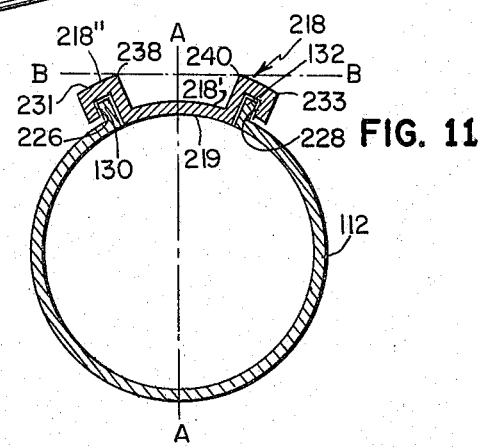
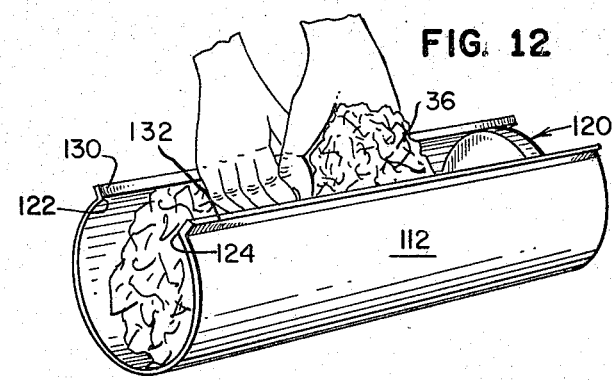
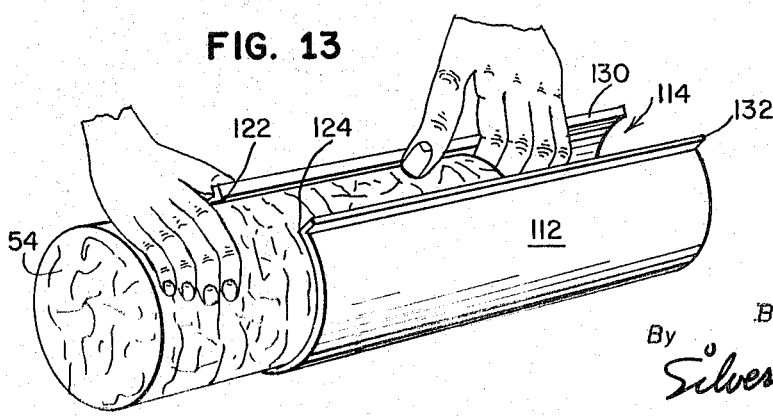
Inventor
Burton L. Siegal.
By Silverman & Coss
Attys.

United States Patent Office 3,290,721
Patented Dec. 13, 1966

3,290,721
FOOD PRODUCT FREEZING DEVICE
Burton L. Siegal, Chicago, Ill., assignor to Dur-A-Case, Inc., Chicago, Ill., a corporation of Illinois
Filed Mar. 3, 1965, Ser. No. 436,906
16 Claims. (Cl. 17—32)

This is a continuation-in-part of copending application Serial No. 313,920, filed October 4, 1963, now abandoned.

This invention relates generally to food freezing devices and more particularly is concerned with a mold for forming a food product by freezing in such a manner as to obviate waste or decreased premium yield.

The restaurateur of today is primarily concerned with a complete knowledge of costs to be able accurately to compute the sales price of the food he serves, and as a concomitant with that technique he must know precisely what he is serving so that he can accurately compute his profit. This has given rise to a highly successful method of handling meats and poultry, designated by different names but basically comprising dealing in pre-formed or pre-cut portions. This is often called "portion control." Instead of buying so many pounds of hamburger or beef or turkey, the user buys so many patties of hamburger weighing precisely so much per patty, so many portions of beef of such and such weight, and so on.

To the bulk meat processor is left the problem of forming the basic product into portions, and the cost problem is thereby extended to the processor. He is required to be accurate and efficient.

Hamburger is relatively simple to handle, but the more desirable cuts of meat and poultry are not. The difficulty lies in forming the portions. Present technique, especially in the case of boneless beef cuts such as strip tenderloin, calls for freezing the product in a roll or sausage-like slug, then slicing the same. To achieve this form, meat is packed into a tubular plastic casing, the ends tied, the package is frozen, and the resulting roll is then sliced. The ends of the resulting member are elliptical or hemispherical. These are not acceptable by the purchaser and the only thing that can be done by the processor is to discard these as waste or grind them into hamburger. In either case, there is a substantial loss. Note that meat cannot be re-frozen.

Considering tenderized strip beef, although drained for a period of about half an hour before freezing, it is still a pliable wet mass when ready for packing into the mold or casing. The water of the product expands, so that the use of rigid molds has heretofore been considered not feasible. The plastic film casings used will permit this expansion without bursting, but the rounded ends result.

The primary object of the invention is to provide a device for serving as a mold for freezing meat and the like in which the mold is substantially rigid and the ends of the resulting frozen roll are substantially planar and normal to the axis of the roll, which is cylindrical in configuration. This enables the roll to be sliced with no waste or ends that require discarding or grinding into hamburger.

Another object of the invention is to provide a freezing mold for meat and the like which is readily disassembled after freezing to make the frozen member immediately available.

Another object of the invention is to provide a freezing mold for meat and the like which is not consumed after use, but may be re-used many times over.

Still another important object of the invention is to provide a freezing device to serve as a mold for food products in which the device is rigid and split along its length, and is adapted to be held in clamped engagement during freezing, and in which the open space formed by the split provides egress for excess moisture and air during the filling of the mold thereby eliminating any spaces in the resulting frozen roll. One may eliminate the open space formed by the split in assembled condition of the device without resulting in undesirable pockets, etc. since sufficient degassing and escape of moisture will occur through the closure joint even if the same comprises a butt or frictionally engaged joint.

Still a further object of the invention is to provide a device of the character described in which the molding body is split along the length thereof with the open space thereof being relatively large to enable the quick and facile packing of meat into the body without the necessity for end-loading required when the open space defined by the split is kept at a minimum, as in the earlier described forms of the invention.

A further object of this invention is to provide a molding device of the character last described with a closure member having an inner face bridging the open space defined by the split being of surface configuration conforming to the inner circumferential surface of the body so as to form an effective continuation thereof thereby to enable formation of a more perfect symmetrical frozen product.

Still another object of the invention is to provide a molding device of the character described in which the edges defining the lateral split of the molding body serve as means for securing the closure member on the mold body thereby eliminating any portions of the earlier structure which could be susceptible to breakage damage during storage and/or use.

Other objects of the invention inclue the provision of a re-usable molding device for freezing meats in portionable sections ready for cutting and/or packaging which is economical to manufacture, use and maintain; which is relatively simple in structure without loss in strength and, in use, is possessed of substantial strength; which is capable of being stacked in rows one on the other without danger of collapse or deformation; and is capable of being easily unloaded subsequent to freezing of said meat.

The above and many other objects of the invention will become apparent to those skilled in this art with a reading of the description of preferred embodiments which follows, in connection with which the drawing accompanying this specification provides illustration.

In the said drawing:

FIG. 9 is a perspective view of a modified form of the food product freezing device or mold, the same being illustrated in assembled condition in use.

FIG. 10 is a transverse sectional view taken through the freezing device shown in FIG. 9.

FIG. 11 is a view similar to that of FIG. 10 but illustrating a modified form of the closure channel and cylinder shown therein.

FIG. 12 is a fragmentary perspective view of the device shown in FIG. 9 illustrating a manner of loading of the same.

FIG. 13 is a view similar to that of FIG. 12 but illustrating a manner of unloading the frozen meat product from the device.

Figure 1:
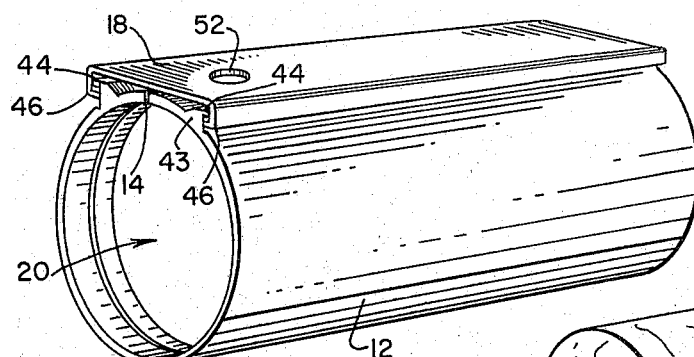
FIG. 1 is a prespective view of a food product freezing device constructed in accordance with the invention, the same being shown assembled and in use.

Generally the invention is characterized by the provision of a relatively rigid metal split cylinder having an elongate closure member engageable with the cylinder for bridging the split and to hold the cylinder against circumferential expansion during freezing of the product on its interior, tongue and groove means on the cylinder and the closure member to effect said engagement and a pair of end pistons tightly engaged in the cylinder and held by the radial compression of the cylinder, preferably formed of some resinous material so that the pistons may be pushed outward by the expanding meat product, but still exert some pressure against the end of the meat product so that when the freezing has been completed, the resulting frozen slug or roll will have been molded into a substantially perfect cylinder.

Referring now specifically to the illustrations, the reference character 10 designates the complete freezing device which comprises a cylinder 12 axially split as shown at 14, provided on its bottom surface with a pair of axially extending radial legs 16 and adjacent the split 14 with means for enabling the seating or clamping of the closure channel 18 thereto. Such means will be described in more detail hereinafter.

The cylinder 12 may be formed in any manner, but preferably is of rigid extruded aluminum so that the legs and seating means for the clamping channel may be integral therewith. The aluminum may be coated by any suitable material, such as applied by electrical process or otherwise. For example, anodizing or the commerically known Sanford Hard Coat process may be used. The purpose is to keep the food product from picking up aluminum dust and the like, to prevent corrosion and to prevent galling because of metal to metal contact.

Figure 3:
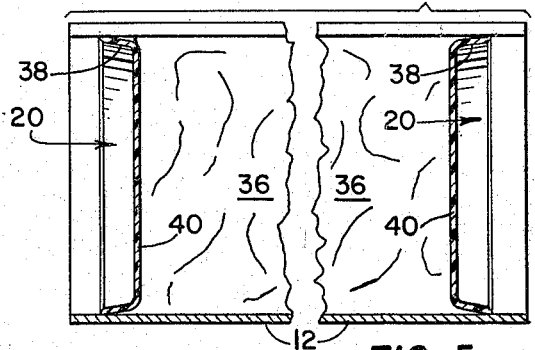
FIG. 3 is a median fragmentary view taken through the freezing device of FIG. 1.
Figure 5:
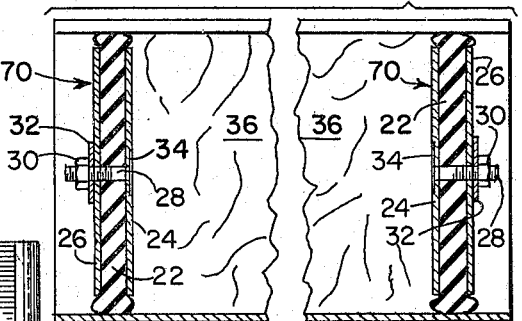
FIG. 5 is a view similar to that of FIG. 3 but illustrating a modified form of the end pistons.

Each end of the cylinder 12 is provided with a cup-shaped piston such as shown at 20 in FIG. 3, tightly fitted therein and arranged concave side outward. This piston 20 may be molded of some resinous material such as polyethylene, nylon or other relatively rigid but yieldable plastic. The piston alternatively may be formed as a sandwich of such resinous or rubber-like material between two rigid metal members held together by a fastener. Such a construction is shown in FIG. 5, in which the central disc 22 of the piston 70, a yieldable material, is sandwiched between an inner metal member 24 and an outer metal member 26 whose diameters are substantially less than the inner diameter of the cylinder 12. A headed bolt 28 passes through all members of the assembly and clamps them together through the medium of a nut 30 and washer 32 on the outer face of the disc 26. The head 34 of the bolt 28 may be countersunk and/or secured to inner face of disc 24 to enable the disc 24 to present a substantially planar face to the food product 36 disposed inside the cylinder. Obviously the diameter of this type of piston is somewhat adjustable.

The pistons 20 of FIG. 3 are of course more economical since they may readily be discarded when the freezing process is completed. The annular wall 38 of the cup-shaped piston may be tapered to pilot entry of the piston 20 of FIG. 3 into the cylinder end. The inner face of the transverse piston wall 20 presents a planar surface to the mass of food product 36 on the interior.

Figure 4:
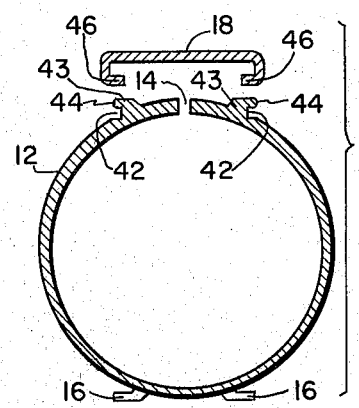
FIG. 4 is a transverse sectional view taken through the freezing device of FIG. 1 showing the same prior to assembly of the closure channel to the cylinder.

The cylinder 12 in each of the forms illustrated has the axially extending split 14 along its length, and it does not require a wide space for the satisfactory operation of the invention. For example, the split may be of the order of several hundredths of an inch. In the form of the cylinder which is shown in FIG. 4, the cylinder 12 has a pair of outwardly facing axially extending parallel grooves 42 formed along the length thereof, each groove being disposed on an opposite side of the split 14. A flange formation 43 at the respective groove thickens and strengthens the cylinder at that point, and there is a lip 44 which cooperates with the body of the cylinder to form an overhanging structure for seating the closure channel 18. In this form, the tongue and groove means comprises said grooves 42 on the cylinder and the flanges or return bent edges 46 on the closure member 18.

In FIG. 4 the closure channel 18 is substantially C-shaped metal member which may be either formed by bending or may be extruded. The free return bent edges 46 are adapted matingly to engage in the respective grooves 42 to clamp the halves of the cylinder together. The split 14 may be much wider than several hundredths of an inch before clamping.

Figure 6:
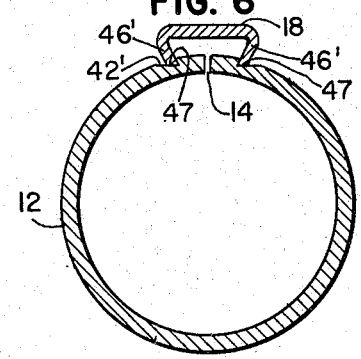
FIG. 6 is a view similar to that of FIG. 4 but illustrating a modified form of the closure channel and cylinder after assembly.

The cylinder may have a wall of varying thickness, with the thinnest portion at the bottom to give the connected halves resilience, and the thickest portion at the top where the flanges 43 are formed. The cylinder 12 of FIG. 6 is of uniform thickness, while that of FIG. 7 is again of varying thickness as in FIG. 3.

Figure 8:
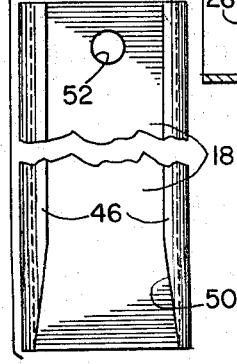
FIG. 8 is a bottom fragmentary plan view of the closure channel.

The return bent edges 46 preferably have a portion cut away or ground off at one end of the closure member 18 as shown in FIG. 8 to form a pilot taper as at 50 so that when installing the closure channel 18, the tapered end may be engaged over the ends of the ears 44 and flanges 43 at one end of the cylinder and pushed home, thereby drawing the lips of the split 14 together.

In use, one of the pistons 20 is inserted into the cylinder end, with the concave cup formation outward. The cylinder is then set up on its end vertically, with the end having the piston therein downward. This may be supported on a mandrel that fits inside the end or the cylinder may be mounted in a suitable socket. The processor then fills the cylinder with the food product 36, such as the strips of meat, and may push the same down into the cylinder so that the same is fairly tight. The split 14 permits excess liquids to run out, and likewise enables the air which otherwise might be entrapped to be expelled. Most meats are fibrous and there will be little if any extrusion through the split 14.

When filled to the desired level, the second piston 20 is inserted. The closure channel 18 is then pushed home to draw up on the halves of the cylinder and compress the pistons radially, so that it is very tightly fixed.

In this condition the cylinder is usually laid on its legs and subjected to low temperatures sufficient to freeze the food product 36. During freezing, the closure channel prevents the radially outward expansion of the cylinder, but the pistons 20 are readily pushed outward toward the respective cylinder ends, while still maintaining a substantial pressure on the ends of the food product to keep the mass squared off on its ends.

Figure 2:
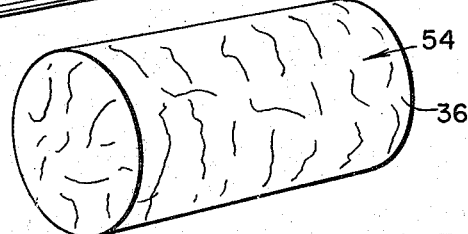
FIG. 2 is a perspective view of a molded slug or roll of meat showing the configuration thereof exactly as it is when removed from the freezing device.

After the freezing process has been completed, the entire cylinder is steamed for a moment. Either before or after this is done, the channel 18 is engaged upon a peg which is anchored in a wall or standard (not shown) through a suitable hole 52 which is formed in the channel and the channel is pulled off. The resulting cylindrical roll 54 (see FIG. 2) is a perfect cylinder. The pistons are readily removed and set aside or discarded, depending upon their construction. The cylinder is then ready for the next use. The roll 54 can be cut into precise discs with no waste or round ends.

In the case of the pistons of FIG. 5, the nut 30 may be tightened before subjecting the device to freezing. Also it may be feasible to use a cup-shaped piston at one end and contracting the cylinder around it before filling the cylinder, then inserting the sandwich type of piston in the other end and screwing up on the nut 30 to extrude the center disc tightly into engagement with the inner wall of the cylinder.

In the construction of FIG. 6, the cylinder is quite simple, being formed of a uniform thickness tube. There are no legs 16, and instead of the flange formations 43 and the grooves 42, V-shaped grooves 42' are cut or otherwise formed in the outer surface of the cylinder wall, on opposite sides of the split 14. The grooves are undercut, relative to a tangent of the cylinder at the split, and the ends 46' of the closure channel slant inward toward one another and have acute angle edges at 47 which extend downward and inward toward one another thereby engaging beneath the overhang of the respective grooves. The ends 46' are not liable to slip out of the grooves 42' and are not readily dislodged because of this mating relationship. It will be noted in FIG. 4 that although the roots of the grooves 42 are substantially vertical, because of the lips 44, the effect is substantially the same as though the grooves 42 were considered to be undercut.

Figure 7:
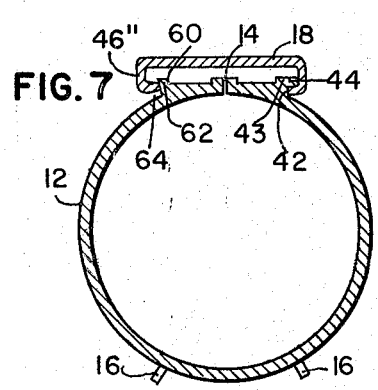
FIG. 7 is a view similar to that of FIG. 6 but illustrating still another modified form of the closure channel and cylinder.

In FIG. 7 there is illustrated a form of the invention in which the means for securing the closure channel are not symmetrical. On the right side of the split 14 there is provided a thickened formation 43 similar to that of FIG. 4 provided also with a groove 42 and a lip 44 overhanging the groove. On the opposite side of the split 14 there is provided a formation 60 which is somewhat like the flanges previously described, but in this case, there is no lip similar to 44. Instead there is an abutment or shoulder 62 that is a slight angle relative to the vertical, this angle being directed inward to form a somewhat vestigial undercut. This is of sufficient angle to prevent the closure channel 18 from coming off during use, but readily removed after use by manually contracting the cylinder, and readily installed by the same method. Actually, the channel 18 in FIG. 7 may be constructed to snap into place. A suitable angled chamfer 64 on the bottom edge of one of the ends 46" enables this. The other end is hooked in the groove 42 and the channel 18 snapped home by pressure. The cylinder may be slightly compressed simultaneously. Obviously the channel 18 may be installed also as described above, by sliding same in from an end.

Referring to FIGS. 9–13, there is shown a modified form of the invention which is characterized by a cylinder provided with a relatively wide split to enable insertion of the meat through the opening comprising the split instead of being end-loaded as described with reference to devices illustrated in FIGS. 1–8. The modified freezing device is designated generally by reference character 110 and comprises a cylindrical mold body 112 axially split as shown at 114 closed off at each end by cup-shaped caps or pistons 120. The circumferential surface opposite the split 114 is provided with a base portion 116 having a relatively planar bottom surface 116'. A closure member 118 is provided for slidable engagement with the split cylinder 112.

The cylinder 112 is formed preferably in the same manner as previously described cylinder 12 and the base portion 116 may be integral therewith. One may also utilize integral legs such as legs 16 in lieu of the base portion 116. Longitudinal edges 122 and 124 face one the other to define the axial split 114 and are spaced apart a relatively wide distance so that the opening defined by said edges 122 and 124 is sufficiently wide enough for the loading of meat therethrough. The end caps 120 may be similar in construction to end caps 20 and/or 70 of device 10, preferably of heavy gauge plastic material.

The device 110 differs from devices 10 and the like also in the configuration of the closure member 118 and the structure of the tongue and groove means provided to effect slidable engagement between said closure member 118 and cylinder 112. The closure member 118 has a planar upper surface 118' which is preferably arranged parallel to the bottom surface 116' of support or base portion 116. This permits stacking of assembled devices during freezing without deformation or instability.

The inner face 119 of closure member 118 which bridges the open space between edges 122 and 124 of the cylinder 112—that is the split 114 in assembled condition of the device 110, has an arcuate configuration to form an effective continuation of the cylinder when the closure is engaged upon the said cylinder.

In the form of the device 110 shown in FIG. 10, the closure member 118 is provided wtih a pair of lateral grooves 126 and 128 opening adjacent the inner face 119 thereof. Each groove is arranged adjacent opposite edges of said closure member 118. The edges 122 and 124 defining split 114 are each provided with an outwardly extending flange or tongue 130 and 132 respectively and extending substantially the entire length of the cylinder 122. The grooves 126 and 128 preferably are arranged at an angle of 25° relative the planar portion 118' of closure 118 and the tongues 130 and 132 are directed divergently along a line normal to a line taken tangential to the circumferential surface of said cylinder 112 at the respective edges 122 and 124.

The closure member 118 is engaged slidably with the grooves 126 and 128 receiving the tongue 130 and 132 respectively for assembly of the device 110. In use, one of the end caps 120 is inserted concave side out at one end of the split cylinder 112. As illustrated in FIG. 12, the meat 36 is loaded through the opening defining the split while the cylinder 112 is arranged substantially horizontally. The cylinder 112 may be canted slightly to facilitate drainage of excess water during the loading operation. Since the opening for entry of meat is large and runs lengthwise along substantially the entire length of the cylinder, less effort is required for loading and thus increased efficiency is realized. The chances of entrapped air or water are reduced because the normal pressure exerted in loading the cylinder 112 is less than would be necessary during end-loading of the earlier described device 10.

The opposite end cap or piston 120 is then inserted, again concave side out to close the end of the cylinder 112. Closure member 118 is then slidably engaged by means of tongue and groove means represented by grooves 126 and 128 in the closure member and ears 130 and 132 on the split defining edges 122 and 124 of the cylinder 112.

After the freezing procedures have been completed, the entire device 110 is steamed for release of the frozen product 54. The end caps 120 are removed preferably with the device 110 arranged horizontally on a table or the like. As shown in FIG. 13, because of the wide opening 114 available, the operator can manually urge the frozen roll 54 from the cylinder 112 by inserting his hand or a tool behind the roll at one end of the cylinder and easily cause the roll to slide along the cylinder to emerge from the opposite end of the cylinder. The movement of the roll from the cylinder is abetted by the ability of the operator continuously to follow the movement thereof by insertion of either hand or tool through the wide split 114. The finished frozen meat product has a substantially perfect symmetrical appearance since the rib which may result from the narrow split 14 of device 10 is absent. Pockets resulting from outgassing are held at a minimum since gas and moisture still escape from the cylinder through the closure joint in spite of hte absence of a narrow open space such as defined by split 14. Any moisture and gases which might remain within the cylinder 112 are not critical so as to result in an undesirable product.

The closure member 118 illustrated in FIG. 10 is preferably formed by extrusion procedures, while the base portion 116 may be separately formed and welded to cylinder 112. If the cylinder is extruded, then, of course, the base may be integral with the cylinder. In many instances, roll forming of the cylinder is preferred.

In FIG. 11 there is illustrated a closure member 218 which differs from closure member 118 in the absence of the planar upper portion 118' thereof. Both the upper surface 218' and the inner face 219 are arcuate in configuration so as to provide an effective continuation of the cylinder 112. Along the parallel opposite lateral edges of closure member 218 and integral therewith, are parallel return bent or inverted "C" shaped channel defining formations 231 and 233 each having planar upper walls 218". The channels 226 and 228 are arranged at an angle of 25° relative the vertical axis of the cylinder along a line A—A shown in FIG. 11. The corners 238 and 240 of said formations 231 and 233 are coplanar as illustrated by reference line B—B of FIG. 11, same being equivalent to a plane taken parallel to the planar surface 118' of closure member 118 shown in FIG. 10. The closure member 218 is well suited to formation by rolling so that in the embodiment illustrated in FIG. 11, both cylinder and closure member preferably are roll formed.

It should be noted that the edges which define the split 114 and the closure flnages 130 and 132 are substantially one and the same, the ears 44 of device 10 being absent. Hence the susceptibility of said ears 44 to possible deformation or breakage in use or storage is avoided. In addition, the material utilized to bridge the space between the split defining edges and respective ears 44 of device 10 is eliminated, hence reducing the weight of the devices, reducing the material weight necessary for formation thereof and thus reducing the cost of the device while retaining all of the advantages of the basic invention.

Although shown as a cylinder, the tubular members 12 and 112 may have an assymmetric cross section, for use in freezing products which it is desired have other than circular configurations when separated into individual portions. Obviously the pistons will have to conform to the inside shape of the tubular member. Other cross-sectional configurations likewise are feasible.

The invention is subject to considerable variation in detail and configuration without departing in any way from the spirit or scope thereof as defined in the appended claims.

What it is desired to secure by Letters Patent of the United States is:

1. A freezing device for molding food products which comprises: a substantially rigid one piece hollow tubular member having opposite longitudinal edges normally biased in spaced facing relationship to define therebetween an axial split along the length of said member, said member having a pair of radially compressible pistons disposed one at each end, and a detachable closure member slidably engaging the exterior of the tubular member along the length thereof on opposite sides of the split for applying a pressure on the tubular member to bring the longitudinal edges closer one to the other simultaneously tending to close the split and radially compress the pistons, the pistons being tightly frictionally engaged within the tubular member during freezing use, but capable of slight axial movement to compensate for expansion of the food product.

2. A freezing device comprising a relatively stiff elongate hollow tubular member having a longitudinally extending split along the length of said member, integral flange formations on opposite sides of the split, said flange formations defining a pair of parallel grooves along the length of the said tubular member with the grooves opening in opposite directions and away from the split, a closure member including return bent edges, the closure member adapted to bridge the split in slidable engagement with said flange formation, the return bent edges engaging respectively in the grooves defined by the flange formations to decrease the width of the split, radially compressible pistons frictionally engaged at opposite ends of the tubular member and under compresion when said closure member is engaged on said tubular member but capable of limited axial movement when placed under interior stress during freezing use.

3. A freezing device for molding food products which comprises an elongate hollow member having opposite longitudinal edges in spaced facing relationship to define therebetween an axial split along the length of said hollow member, a pair of radially compressible pistons at each end of the hollow member, each piston having an outer configuration conforming to the inner configuration of the hollow member and frictionally engaged therewithin, a detachable closure member for engaging the hollow member along the length thereof, and tongue and groove means formed on the closure member and along the facing edges of the hollow member parallel thereto to permit engagement of the closure member with the hollow member bridging said axial split while applying a pressure to bring the said edges closer one to the other reducing said split width, and radially to fix the pistons in position against all but slight axial movement in compensation for expansion of said food product during the freezing process.

4. The freezing device as claimed in claim 3 in which the pistons have a planar configuration facing the interior of the hollow member during the freezing process.

5. The freezing device as claimed in claim 3 in which the said opposite facing edges of said hollow member are spaced apart sufficiently to enable loading of the device therethrough.

6. The freezing device as claimed in claim 3 in which the groove means is formed in the hollow member and the tongue means is formed on the closure member.

7. The freezing device as claimed in claim 3 in which the groove means is formed in the hollow member along the said facing edges but spaced therefrom and the tongue means comprises a return bent flange formation along each lateral edge of the closure member for slidable engagement within said grooves.

8. The freezing device as claimed in claim 3 in which the tongue means comprises outwardly directed flanges integral with the hollow member adjacent the facing edges thereof and the groove means is formed in the closure member along each lateral edge thereof.

9. A freezing device for molding food products which comprises an elongate hollow member having opposite longitudinal edges in spaced facing relationship to define therebetween an axial split along the length of said hollow member, a pair of pistons at each end of the hollow member, each piston having an outer configuration conforming to the inner configuration of the hollow member and frictionally engaged therewithin, a detachable closure member for engaging the hollow member along the length thereof, and tongue and groove means formed on the closure member and along the facing edges of the hollow member parallel thereto to permit engagement of the closure member with the hollow member bridging said axial split while applying a pressure to the hollow member to contract the same to bring the said edges closer one to the other and radially to compress the pistons whereby to fix the position thereof, the pistons being capable of slight axial movement to compensate for expansion of said food product during the freezing process, said pistons having a planar configuration facing the interior of the hollow member during the freezing process and the inner face configuration of the closure member in assembled condition of the device conforming to the circumferential configuration of the hollow member whereby to comprise a continuation thereof bridging the axial split.

10. A freezing device for molding food products which comprises an elongate hollow member having opposite longitudinal edges in spaced facing relationship to define therebetween an axial split along the length of said hollow member, a pair of pistons at each end of the hollow member, each piston having an outer configuration conforming to the inner configuration of the hollow member and frictionally engaged therewithin, a detachable closure member for engaging the hollow member along the length thereof, and tongue and groove means formed on the closure member and along the facing edges of the hollow member parallel thereto to permit engagement of the closure member with the hollow member bridging said axial split while applying a pressure to the hollow member to contract the same to bring the said edges closer one to the other and radially to compress the pistons whereby to fix the position thereof, the pistons being capable of slight axial movement to compensate for expansion of said food product during the freezing process, said pistons having a planar configuration facing the interior of the hollow member during the freezing process and said closure member having an outer planar surface and an inner surface conforming to the configuration of the hollow member to serve as a bridging continuation thereof.

11. A freezing device for molding food products which comprises an elongate hollow member having opposite longitudinal edges in spaced facing relationship to define therebetween an axial split along the length of said hollow member, a pair of pistons at each end of the hollow member, each piston having an outer configuration conforming to the inner configuration of the hollow member and frictionally engaged therewithin, a detachable closure member for engaging the hollow member along the length thereof, and tongue and groove means formed on the closure member and along the facing edges of the hollow member parallel thereto to permit engagement of the closure member with the hollow member bridging said axial split while applying a pressure to the hollow member to contract the same to bring the said edges closer one to the other and radially to compress the pistons whereby to fix the poistion thereof, the pistons being capable of slight axial movement to compensate for expansion of said food product during the freezing process, said pistons having a planar configuration facing the interior of the hollow member during the freezing process and said closure member having an outer surface and an inner surface conforming to the configuration of the hollow member to serve as a continuation thereof in assembled condition of the device, and a formation integral with the longitudinal edges of said closure member to define said groove means, the same opening to the inner surface.

12. A freezing device as claimed in claim 1 in which said closure member straddles the split and tongue and groove means are provided on said closure and tubular members.

13. A freezing device as claimed in claim 1 in which said closure member straddles the split and tongue and groove means are provided on said closure and tubular members, including a longitudinal groove formed in one of said members and a longitudinal tongue formed on the other of said members and adapted to be slidably received in said groove.

14. A freezing device as claimed in claim 13 in which the closure member is adapted to be axially slid into the grooves from one end of the cylinder and the leading end of the closure member has pilot means for leading the cylinder grooves to the closure member and drawing the cylinder halves together as the closure member is slid home.

15. A freezing device as claimed in claim 1 in which said closure member straddles the split and tongue and groove means are provided on said closure and tubular members, including parallel longitudinal grooves formed in said tubular member opening to the exterior thereof and spaced from said longitudinal edges and parallel longitudinal tongues formed on the closure member and adapted to be slidably received in said grooves.

16. A freezing device as claimed in claim 1 in which said closure member straddles said split, and cooperable tongue and groove means being provided on said tubular member and said closure member to enable a slidable engagement therebetween against the normal bias of said edges whereby to reduce the longitudinal width of the split to place the tubular member under tension.

References Cited by the Examiner

UNITED STATES PATENTS

| 31,856 | 3/1861 | Wilson | 220—24.5 X |
|---|---|---|---|
| 345,316 | 7/1886 | Ortman | 249—82 X |
| 559,788 | 5/1896 | Perrottet. | |
| 1,044,438 | 11/1912 | Briggs | 17—32 |
| 1,101,084 | 6/1914 | McCarty | 220—24 X |
| 1,139,550 | 5/1915 | McCracken. | |
| 1,463,749 | 7/1923 | Pollak | 24—268 X |
| 1,486,445 | 3/1924 | Mayol. | |
| 1,762,440 | 6/1930 | Howe | 249—173 |
| 2,072,518 | 3/1937 | Brown | 249—82 |
| 2,259,854 | 10/1941 | Langel | 249—173 X |
| 2,424,542 | 7/1947 | Adams. | |
| 2,611,250 | 9/1952 | Rodacker | 17—32 |

SAMUEL KOREN, *Primary Examiner.*

H. P. DEELEY, JR., *Assistant Examiner.*